May 18, 1965    A. B. C. RANKIN ETAL    3,183,709
ULTRASONIC TESTING OF MATERIAL

Filed April 7, 1960    8 Sheets-Sheet 1

A.B.C. RANKIN,
E.F. FRENCH, &
H.W. TAYLOR
INVENTORS

BY Moore & Hall
ATTORNEYS

May 18, 1965 A. B. C. RANKIN ETAL 3,183,709
ULTRASONIC TESTING OF MATERIAL
Filed April 7, 1960 8 Sheets-Sheet 2

A.B.C. RANKIN,
E. F. FRENCH, &
H. W. TAYLOR
INVENTORS

BY Moore & Hall
ATTORNEYS

United States Patent Office 3,183,709
Patented May 18, 1965

3,183,709
ULTRASONIC TESTING OF MATERIAL
Alexander Bryce Calder Rankin, Ernest Frederick French, and Harold William Taylor, all of Barkingside, England, assignors to Kelvin & Hughes Limited, Glasgow, Scotland, a British company
Filed Apr. 7, 1960, Ser. No. 20,673
Claims priority, application Great Britain, Apr. 8, 1959, 11,898/59; Feb. 22, 1960, 6,198/60
6 Claims. (Cl. 73—67.5)

The present invention relates to ultrasonic testing of material and is particularly concerned with the testing of tubes and bars of circular cross-section.

Figure 1:
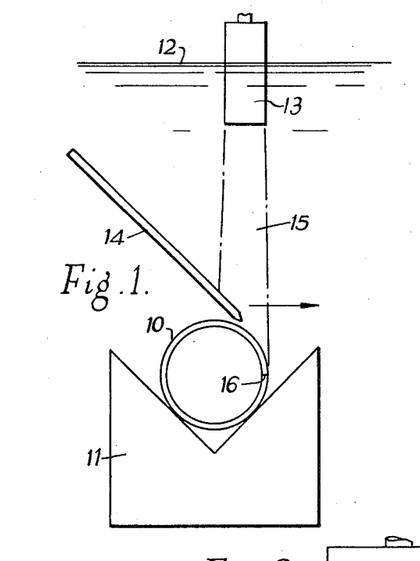

It is often required to detect radially extending longitudinal cracks in such material and there has been used for the purpose apparatus such as is shown in FIG. 1 of the accompanying drawings. In FIG. 1 a tube 10 under test is shown supported upon a V-block 11 in a tank containing water, the upper surface of which is indicated at 12. A transducer 13 is arranged above the tube under test and a plane reflector or screen 14 is arranged as shown with its plane at about 45° to the axis of the beam 15 of ultrasonic waves from the transducer. The effect of the reflector 15 is to prevent waves from impinging upon and being reflected from the top of the tube 10 and to restrict the angles of incidence of the waves upon the tube in such a manner that the thickness echo (that is the echo from the inner surface of the top of the tube) is avoided and that longitudinal waves are not generated in the material of the tube 10. If a radial crack, such as that indicated at 16, is present, waves are reflected back to the transducer 13 where they are converted into electrical oscillations and displayed in well-known manner.

The following difficulties have been experienced in operating this known apparatus:

(a) It is difficult to restrict the range of angles of incidence sufficiently to prevent the generation of confused echoes.

(b) It is often desired to test long lengths of material and immersion in water is then difficult. It has been proposed that the material should be passed into and out of the tank through sealing gaskets but this introduces difficulties, particularly when one sample has to be completely withdrawn and replaced by another.

(c) The known apparatus does not provide a monitor signal which can be used as a measure of the efficiency of operation or for automatic gain control purposes.

The present invention has for its principal object to provide improved apparatus of the character hereinbefore discussed in which one or more of the difficulties referred to are avoided or at least substantially reduced.

According to the present invention there is provided apparatus for the ultrasonic testing of material and suitable for use in testing rods or tubes of circular cross section, comprising means for supporting the material under test, a transducer, the beam-directing means including an apertured member for directing a beam off ultrasonic energy toward the material in such a manner that the axis of the beam passing through the aperture is inclined at an acute angle to the normal to the part of the surface of the material upon which the beam impinges.

A single transducer or two separate transducers close together may be provided for transmitting the waves and for receiving the echoes.

According to one feature of the invention the said beam-directing means is provided with two apertures disposed symmetrically on opposite sides of a plane containing the axis of the material under test and the centre of the wave-emitting face of the transducer, the axes of the beams of ultrasonic energy emerging from the apertures or passages being inclined at an acute angle to the normals to the parts of the surface of the material upon which the beams impinge. Such an arrangement is well adapted to provide a monitoring signal as will be explained hereinafter.

According to another feature of the invention, the transducer or transducers is or are arranged in a tank beneath the beam-directing means. In this way it can be arranged that only the lower part of the material under test is beneath the surface of water in the tank and the difficulty (b) is thereby avoided. The beam-directing means may serve as the supporting means for the material under test.

Means may be provided whereby the transducer and beam-directing means can be rocked in such a manner as to vary the value of the angle of the beam axis to the normal to the surface of the material upon which the beam impinges.

In order to render the apparatus suitable for use in testing rods or tubes of a range of different diameter, means are preferably provided whereby the transducer and beam-directing means can be moved in the direction of the beam axis.

When testing tubes or rods it is usually required to examine the tube or rod through 360° and for this purpose relative rotation must be effected between the probe (including the transducer and beam-directing means) and the tube or rod and there must also be relative movement of the probe and tube or rod in the direction of the axis of the tube or rod. In effect what is required is a helical scan. It is often difficult or even impossible to rotate the material under test and it is then necessary to move the probe around the material: the material can be fed simultaneously past the probe thus producing the desired helical scan. However such rotation of the probe requires a slip ring to convey electrical signals to and from the probe and such slip rings have been found to deteriorate rather quickly.

In order to overcome this difficulty, according to a further subsidiary feature of the invention, there are provided a plurality of probes, these being made rockable about the axis of the material under test. In the case of four probes, they may be made rockable about 90°. In this way flexible electrical connections may be provided and the need for slip rings avoided.

The invention will be described, by way of example, with reference to FIGS. 2 to 6 of the accompanying drawings which are to be taken as illustrative of presently preferred embodiments of the invention and are not to be construed as limiting. Like numbers refer to like parts throughout.

Figure 2:
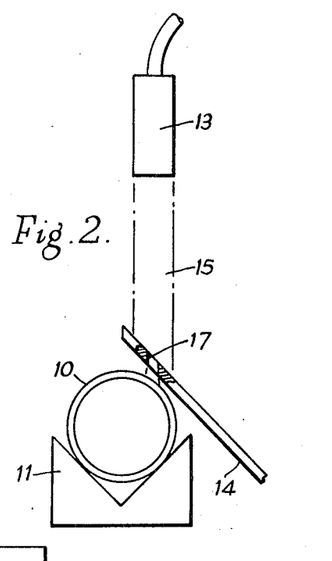
FIGS. 2 and 3 are diagrammatic representations of two embodiments of the invention.

Referring first to FIG. 2, like parts have the same references as in FIG. 1. The screen 14, which is at 45° to the beam 15, is provided with a narrow aperture or slot 17 and the underside of the screen is arranged close to the upper surface of the tube 10. In this way the range of angles of incidence is limited since it is a function of the ratio of the wavelength in water to the width of the aperture.

For example if the frequency of the ultrasonic waves is 5 mc./s., the wavelength in water is 0.3 mm. If the width of the slot is 3 mm., the semi-angle of the beam leaving the aperture will be about 6.5°. The side lobes in which there is relatively little energy (about 4% of the energy in the main lobe) will be ignored. With the assumptions set forth the range of angles of incidence will be about 12° centered around 23° which is assumed to be the angle of incidence of the axis of the beam. Under these conditions little or no surface waves will be generated in the material under test, the mode being nearly pure shear when the tube wall thickness is greater than several wavelengths. With thinner-walled tubes Lamb waves will be generated. When a slot 17 is used rather than a circular or square aperture, the "width" referred to is the dimension as seen in FIG. 2, that is the dimension perpendicular to the axis of the tube 10 and to the beam axis. The other dimension, that is that parallel to the axis of the tube, is less important.

Figure 3:
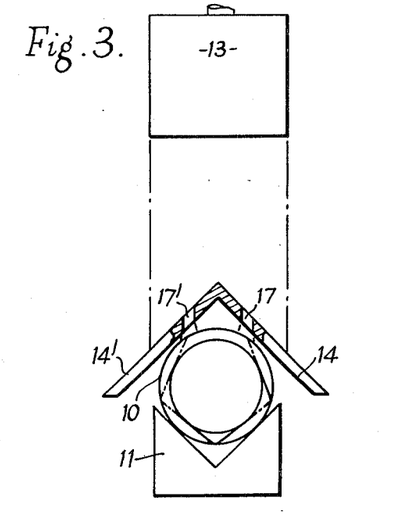

Referring now to FIG. 3, two screens 14 and 14' are provided at 90° to one another and having slots or apertures 17 and 17'. This arrangement is symmetrical and the apertures 17 and 17' are disposed symmetrically upon opposite sides of a plane containing the axis of the tube 10 and the centre of the wave-emitting face of the transducer 13. Waves pass around the tube in opposite directions; one wave entering through the aperture 17 passes around the tube and out through the aperture 17' to reach the transducer 13 and the other wave entering through the aperture 17' passes around the tube and out through the aperture 17 to reach the transducer 13.

Figure 4:
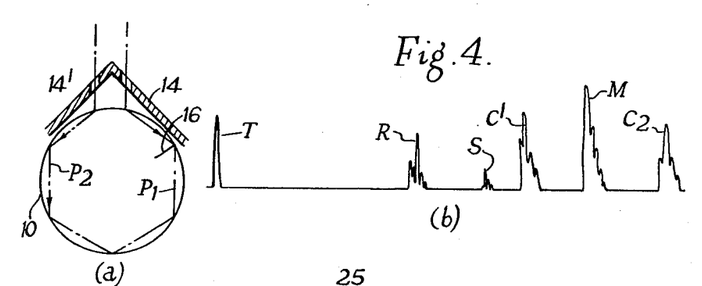
FIG. 4 shows at (a) the paths of waves in a tube under test and at (b) the presentation obtained on the screen of a cathode ray tube from the waves at (a)

Referring to FIG. 4(a) one wave path is indicated at $P_1$ and the other at $P_2$. A crack is shown at 16. The display that may be obtained with conditions as in FIG. 4(a) is shown in FIG. 4(b). The transmitted pulse is shown at T, the reflection from 14 and 14' at R, the reflection from the surface of the tube 10 at S, the reflection from the crack 16 from waves along path $P_1$ is shown at $C_1$, the waves passing around both paths $P_1$ and $P_2$ and reaching the transducer simultaneously produce the signal M and the echo from the crack 16 from waves along path $P_2$ is shown at $C_2$.

It will be noted that as the tube 10 is rotated about its axis, the signals $C_1$ and $C_2$ will move toward or away from the signal M but will remain at equal distances from M. When the crack 16 is at the bottom of the tube 10, the signals $C_1$ and $C_2$ will merge with the singal M.

The signal M can be used as a monitoring signal since its amplitude (when not merged with $C_1$ and $C_2$) will be representative of the efficiency of operation of the apparatus. As will be described hereinafter with reference to FIG. 10, the signal M can be selected by a suitable gate and rectified to produce a gain control signal to control the gain of the amplifier into which signals picked up by the transducer are fed.

Figure 5:
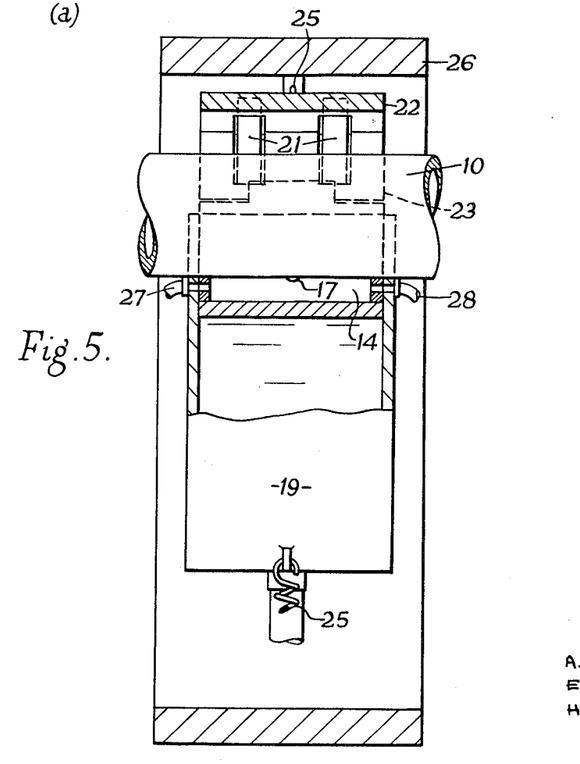
FIG. 5 is a diagrammatic view in sectional side elevation of another embodiment of the invention.
Figure 6:
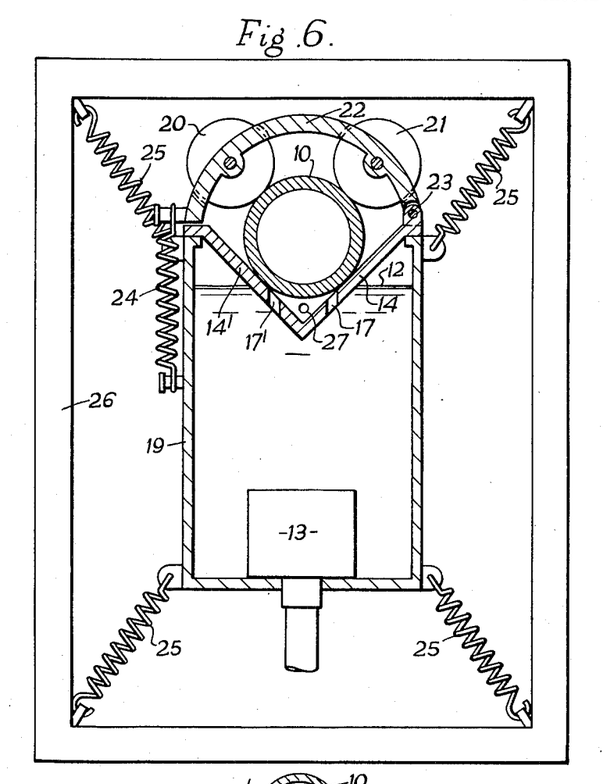
FIG. 6 is a view in sectional front elevation of the embodiment of FIG. 4.

Referring now to FIGS. 5 and 6, there is shown a tank 19 having a probe 13 including the transducer or transducers mounted near its bottom. The screens 14 and 14' are supported from the top of the tank and serve to support a tube 10 under test. The tube 10 is held in position by two pairs of nylon rollers 20 and 21 mounted upon a stirrup 22 hinged at 23 to the top of the tank and drawn by a spring 24 into engagement with the tube 10.

The structure described is supported by four springs 25 in a fixed frame 26. Inlet and outlet pipes 27, 28 are provided for circulating water through the tank, the level being maintained at 12. In operation only the lowermost part of the tube 10 is immersed in the water.

The yielding mounting by the springs 25 permits the tank 19 and the structure mounted thereon to move as required when the tube or bar fed through is not straight.

Figure 7:
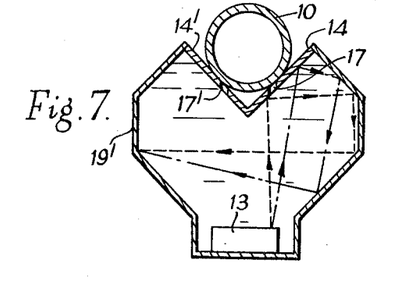
FIG. 7 is a diagrammatic view in cross-section showing a preferred shape of tank.

The tank preferably has the shape shown at 19' in FIG. 7. In this way waves following paths, such as those indicated by broken lines, other than directly through the apertures 17 and 17' are so reflected that they travel for a large distance in the water before they can emerge through the apertures and are, therefore, greatly attenuated.

Figure 8:
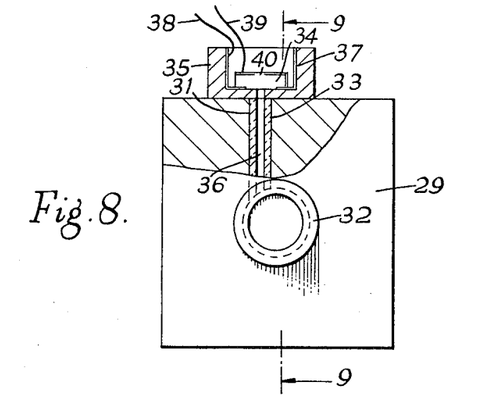
FIG. 8 is a view in front elevation, partly in section, of another embodiment of the invention.
Figure 9:
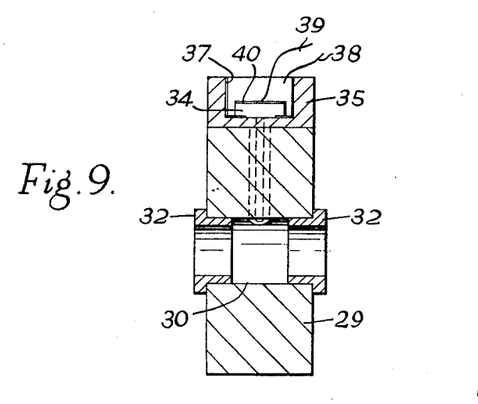
FIG. 9 is a view in section on the line 9—9 of FIG. 8.

Referring to FIGS. 8 and 9, a block 29 of suitable material, metal or non-metal, has formed in it a first hole 30 and a second hole 31. The first hole 30 is provided with bushes 32 which serve to support a rod or tube to be tested which is not shown. The axis of the hole 31 is off-set from that of the hole 30. A bushing 33, for instance of a suitable plastics mateiral, is provided in the hole 31. A piezo-electric crystal 34 is mounted in a cup 35 on top of the block, the crystal being disposed centrally over the hole 36 in the bushing 33. The inside of the cup 35 may be metallised at 37 so as to make contact with a metal coating on the lower face of the crystal 34 and electrical connections 38, 39 are provided to the metallising 37 and to a metal coating 40 on the upper face of the crystal respectively.

The hole 36 serves to direct a beam of ultrasonic energy from the crystal transducer 34 on to material in the hole 30, the axis of this beam making an acute angle, for instance an angle of about 25°, with the normal to the part of the surface of the material impinged upon by the beam.

The crystal 34, in this embodiment, is used as a transmitting and receiving transducer. The whole device illustrated may be immersed in water or other liquid which is arranged to fill the spaces traversed by the ultrasonic waves.

Alternatively the bushes 33 themselves or water-retaining washers thereon may be arranged to provide a water-tight seal between the bushes and the material under test. Suitable water entry and relief holes are provided so that the annular space between the material under test and the wall of the hole 30, the hole 36 and the lower part of the cup 35 are maintained full of water.

The bushes 32 may be arranged to be detachable in order that bushes to accommodate different sizes of rod or tube can be used. The bushing 36 may also be made removable to permit holes 36 of different sizes to be used.

In a modification the crystal 34 is arranged to act only as a transmitting transducer and a separate transducer is provided for receiving waves from the material under test. The second transducer may be arranged with a cup and bushing corresponding to 35 and 33, this other bushing being disposed in a suitable position according to requirements. For instance it may be parallel to the bushing 33 and spaced therefrom in a direction along the axis of the hole 30 or it may have its axis in the plane of the paper in FIG. 8 and be directed toward a different part of the surface of the material.

If the block 29 is of a material, such as "Tufnol," which is acoustically opaque, the bushing 33 can be omitted and a hole of suitable size is then provided in the block.

Figure 10:
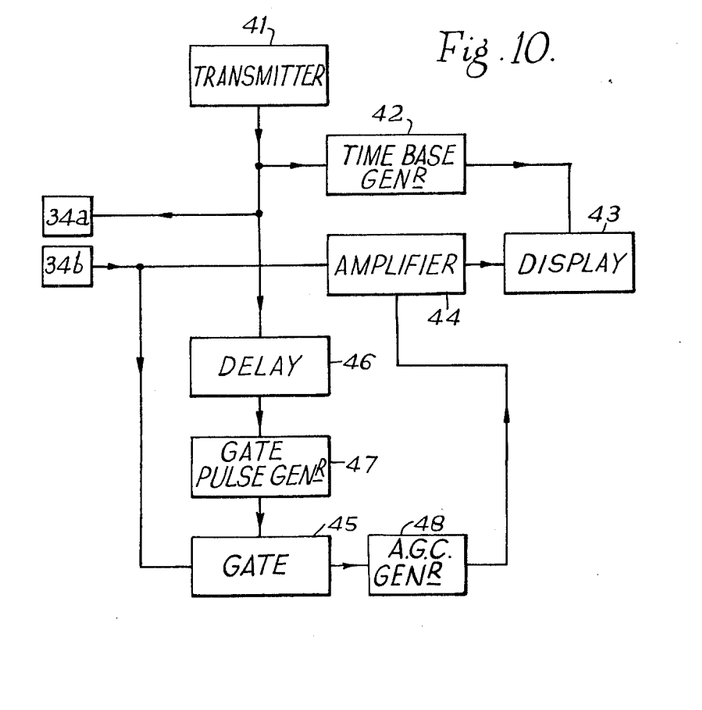
FIG. 10 is a block diagram of a circuit for use in carrying out the invention.

Referring to FIG. 10, there is shown a transmitting transducer 34a and a receiving transducer 34b. Ultrasonic pulses from a transmitter 41 are fed to the transducer 34a and to control a time-base generator 42 which supplies a time-base waveform to a display device 43, such as a cathode ray tube. Echo signals picked up by the transducer 34b are fed to an amplifier 44 and thence to the display device 43.

The echo signals from 34b are also fed to the input of a gate 45. Pulses from the transmitter 41 are delayed in a device 46 and applied to a gate pulse generator 47 which generates gating pulses to open the gate 45 at a desired time after transmission of a pulse. The signal so selected may be the signal M hereinbefore referred to in connection with FIG. 4. The selected signal passes through the gate 45 to an A.G.C. generator 48 which generates an automatic gain control voltage for application by a lead 49 to the amplifier 44.

Figure 11:
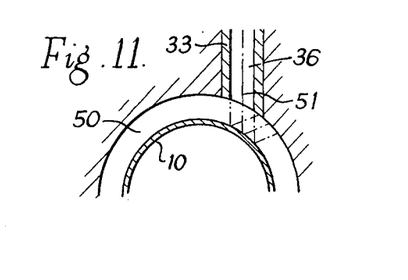
FIG. 11 is a diagrammatic sectional view for use in explaining factors which should be taken into account in choosing space between the beam-directing means and the material under test and the angle between the axis of the beam and the surface on which th beam impinges.

Referring to FIG. 11, as described with reference to FIGS. 8 and 9, ultrasonic waves are directed by the hole 36 in the bushing 33 on to a tube 10 under test. There is a space 50 between the end of the bushing and the surface of the tube 10. The paths of ultrasonic waves emerging from the hole 36 and after reflection from the surface of the tube 10 are indicated in broken lines. In order to obtain a good signal to noise ratio it is important that the radial depth of the space 50 and the angle between the beam axis 51 and the normal to the surface on which the beam impinges should be such that none of the wave energy is reflected directly back up the hole 36. Thus with the conditions shown in FIG. 11 the waves have to pass all round the space 50 before they can re-enter the hole 36.

Figure 12:
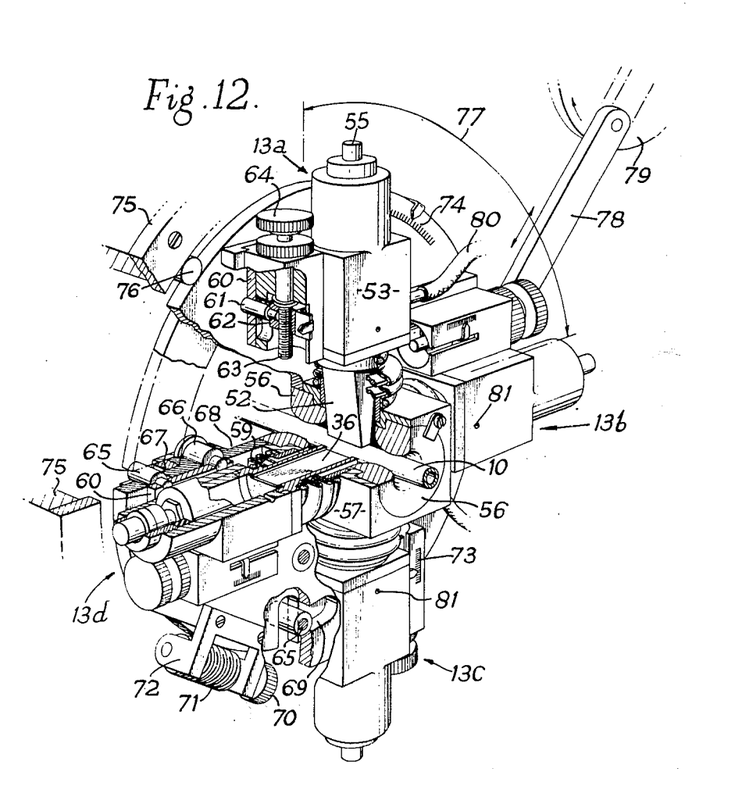
FIG. 12 is a perspective view, partly in section, showing a part of an embodiment of the invention using four probes
Figure 13:
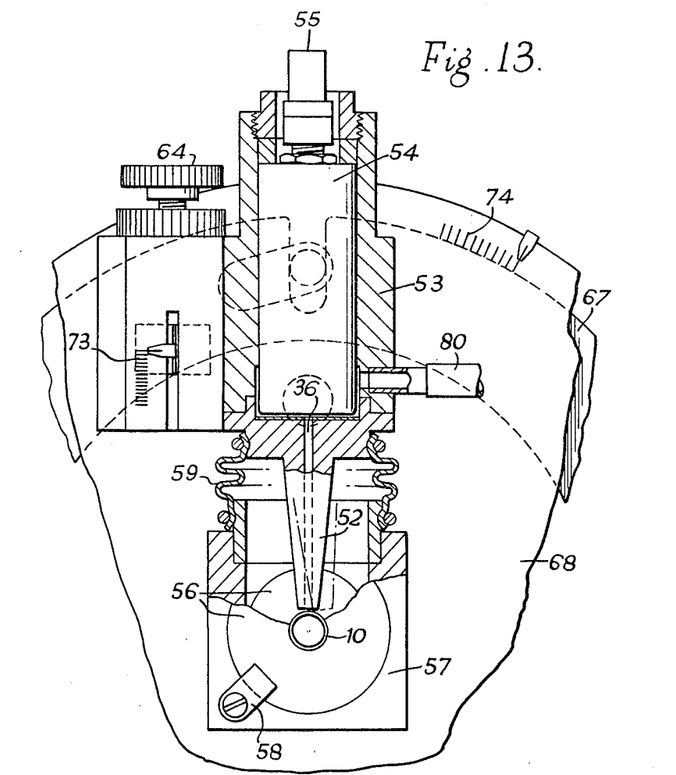
FIGS. 13 and 14 are views in section of one of the probes in FIG. 12 in two different angular positions.

Referring now to FIGS. 12 to 14 a tube 10 under test is arranged to be moved in the direction of its axis through a space bounded by four probes 13a, 13b, 13c and 13d arranged with their axes at 90° to one another. As best shown in FIG. 13, each probe comprises a tapering member 52 having the beam-directing aperture 36 therein. This aperture may be a slot elongated in the direction of the axis of tube 10. The member 52 is fixed to a casing 53 containing a transmitting/receiving transducer 54, a terminal 55 serving to make electrical connection with the transducer.

The tube 10 passes through sealing bushes 56 which are replaceable and held in position in a body 57 by clips 58 and which provide a water-tight closure for the space into which the probes project. The casings 53 of the four probes are flexibly coupled in a water-tight manner to the body 57 by means of bellows 59.

The four probes are slidably mounted on a plate 60 (FIG. 12). In the case of each probe a pin 61 fixed to the plate 60 enters an aperture in a nut 62 on a threaded adjusting screw 63. Rotation of the head 64 of the screw 63 produces movement of the probe 52, 53 in a radial direction, thereby permitting the probes to be adjusted for use with tubes 10 of various diameters.

Figure 14:
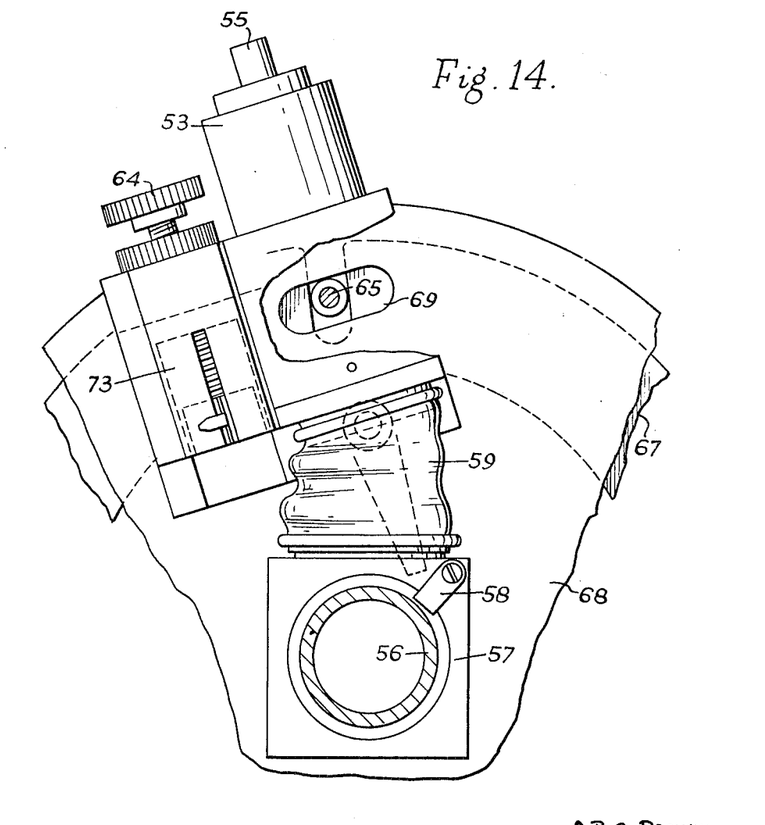

The plate 60 carries, for each probe, two pins 65 and 66. The outer pin 65 is rotatable in an aperture in a ring 67 which is rotatable about the axis of tube 10 relatively to a disc 68, the pin 65 passing through an elongated aperture 69 in the disc 68 which permits limited relative movement of the disc 68 and ring 67. The radially inner pin 66 is rotatable in an aperture in the disc 68. Limited angular movement of the disc 68 relatively to the ring 67 is produced by rotating the head 70 of a worm screw 71 engaging in the toothed edge of the ring 67, the screw 71 working in bearings in a frame 72 fixed to the disc 68. This relative angular movement causes a change to take place in the angle of the axis of the probe relatively to a radius of the assembly. FIG. 13 shows the positions when the axis of the probe is radial and when its inner extremity has been brought close to the axis of the assembly by adjusting the knob 64. FIG. 14 shows the positions when the axis of the probe has been tilted by operating the knob 70 and when the probe has been withdrawn by operating the knob 64. The radial position of each probe is indicated on a separate scale 73 while the angular position of all four probes is indicated on a scale 74.

The whole assembly described is rotatably mounted in a fixed frame 75 by means of rollers 76. The assembly is rotated to and fro through 90°, as indicated by the arrow 77 in FIG. 12, by means of a crank 78 which is reciprocated by means of a member 79 driven by an electric motor (not shown).

In order to maintain acoustic coupling between the transducer of each probe and the tube 10, water is fed into the casing 53 through a pipe 80. As best seen in FIG. 13 the water can pass around the end of the probe and through the aperture 36 into the space which is made water-tight by the bushes 56. The water thus fills the space between the transducers (not shown in FIGS. 12 to 14) and the tip of the beam-directing members 52. One or more bleed holes 81 are provided to permit air and surplus water to escape.

Flexible leads (not shown) from the four terminals 55 may be connected together and to the display device. If necessary suitable impedance elements are provided in association with the connections to the different probes in order to provide proper impedance matching. In the absence of such matching much sensitivity is lost in comparison with equipment using a single probe.

If desired switching or commutating means may be provided for connecting the four probes in succession to the display device. The changes in connection may be made sufficiently fast to take advantage of persistence of vision in avoiding flicker.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Apparatus for the ultrasonic testing by reflecting of an ultrasonic beam, of material in the form of elongated members of circular cross-section, comprising means for supporting said material, a transducer means for generating ultrasonic waves and beam-forming means disposed between said transducer and said material and directing a beam of said waves upon said material, the axis of said beam being inclined at an acute angle to the normal to the part of the surface of said material impinged upon by said beam so that the material is vibrated substantially in a single preselected mode representing at least ninety percent of the effective ultrasonic energy received by the material under test wherein said beam forming means comprise two apertured members, said apertures being disposed symmetrically on opposite sides of a plane containing the axis of the material under test and the centre of the wave-emitting face of the transducer, the axes of the beams of ultrasonic energy emerging from the apertures or passages being inclined at an acute angle to the normals to the parts of the surface of the material upon which the beams impinge.

2. Apparatus according to claim 1, wherein the beam-directing means are in the form of two plates arranged at an acute angle to one another, one of the apertures being provided in each plate.

3. Apparatus for the ultrasonic testing of material in the form of elongated members of circular cross-section, comprising means for supporting said material, a transducer for generating ultrasonic waves and beam-forming means disposed between said transducer and said material and directing a beam of said waves upon said material, the axis of said beam being inclined at an acute angle to the normal to the part of the surface of said material impinged upon by said beam, the said beam-forming means comprising two apertured members, said apertures being disposed symmetrically on opposite sides of a plane containing the axis of the material under test and the center of the wave-emitting face of the transducer, the axes of the beams of ultrasonic energy emerging from the apertures or passages being inclined at an acute angle to the normals to the parts of the surface of the material upon which the beams impinge, the beam-directing means being in the form of two plates arranged at an acute angle to one another, one of the apertures being provided in each plate, and so arranged that said plates constitute the said supporting means.

4. Apparatus for the ultrasonic testing by the reflection of an ultrasonic beam of small cross-section, of material in the form of elongated members of circular cross-section, comprising means for supporting said material, a transducer for generating ultrasonic waves, said supporting means comprising two apertured plates disposed at an acute angle to one another with said apertures in the path of said waves and acting to restrict the effective portion of said waves to a plurality of beams of small cross-section.

5. Apparatus for the ultrasonic testing of material and suitable for use in testing rods and tubes of circular cross-section, comprising means for supporting the material under test, transducer means for generating a beam of ultrasonic waves for injection into said material and receiving reflected waves from said material and beam-confining and directing means, said supporting means and said beam directing means comprising two apertured plates arranged at an acute angle to one another, said material being supportable in said acute angle in engagement with both said plates, and said transducer means being disposed to direct said beam upon the apertures in said plates, said apertures confining the waves passing therethrough into said material to substantially a single mode.

6. Apparatus for the ultrasonic testing of material and suitable for use in testing rods and tubes of circular cross-section comprising a liquid-retaining tank, means for supporting material under test with its under surface beneath the surface of liquid in said tank and transducer means located in said tank beneath said supporting means, said transducer means directing a beam of ultrasonic waves upward upon said supporting means, said supporting means comprising an apertured plate located in the path of said beam, the aperture in said plate having its axis at an acute angle to the normal to the surface of material upon said supporting means at the point at which said axis intersects the surface of the material and said aperture confining the waves from said beam passing therethrough into said material to substantially a single mode.

References Cited by the Examiner

UNITED STATES PATENTS

| 2,505,867 | 5/50 | Meunier | 73—67.6 |
| 2,740,289 | 4/56 | Van Valkenburg et al. | 73—67.9 |
| 2,795,133 | 6/57 | Ots | 73—67.7 |
| 2,819,613 | 1/58 | Neiley | 73—67.7 |
| 2,940,305 | 6/60 | Williams et al. | 73—67.8 |
| 3,063,290 | 11/62 | Kaserman et al. | 73—67.8 |

FOREIGN PATENTS 1,193,044  4/59  France.

OTHER REFERENCES

Article by Moriarty in Transactions of ASME, vol. 73, 1951, page 225.

Book: Non Destructive Testing Handbook by McMaster, vol. 2, 1959, pages 47.26–47.39.

RICHARD C. QUEISSER, *Primary Examiner.*

CHARLES A. CUTTING, *Examiner.*